United States Patent

[11] 3,601,686

| [72] | Inventor | George A. Gautherin<br>Woodside, N.Y. |
|---|---|---|
| [21] | Appl. No. | 762,934 |
| [22] | Filed | Sept. 26, 1968 |
| [45] | Patented | Aug. 24, 1971 |
| [73] | Assignee | Lambda Electronics Corporation<br>Huntington, N.Y. |

[54] AC REGULATOR EMPLOYING A CONTROL RECTIFIER SWITCHING CIRCUIT
2 Claims, 4 Drawing Figs.

[52] U.S. Cl............................................. 323/9,
 323/17, 323/20, 323/24, 323/34, 323/45
[51] Int. Cl............................................. G05f 1/30
[50] Field of Search................................. 321/9, 18;
 323/16, 17, 20, 22 SC, 24, 34, 45, 9; 307/252, 252 T

[56] References Cited
UNITED STATES PATENTS

| 3,501,771 | 3/1970 | Miller et al. | 323/24 X |
| 3,263,157 | 7/1966 | Klein | 323/22 (SCR) |
| 3,303,414 | 2/1967 | Jensen | 323/22 X (SCR) |
| 3,342,167 | 9/1967 | Tarter | 307/252 X |
| 3,370,223 | 2/1968 | Senetcen | 323/45 X |
| 3,384,763 | 5/1968 | Harris, Jr. | 307/252 |
| 3,448,371 | 6/1969 | Boymel | 323/24 X |
| 3,470,448 | 9/1969 | Krabbe | 321/9 |

Primary Examiner—J. D. Miller
Assistant Examiner—A. D. Pellinen
Attorney—Morgan, Finnegan, Durham and Pine ABSTRACT: An AC regulator which employs inductance, a resonant circuit and controlled rectifier switching between the input terminals connected to the AC voltage to be regulated, and the output terminals which supply the regulated AC output. The controlled rectifier switching circuit is regulated by a control system which monitors the output voltage and controls the firing of a pair of oppositely-polarized parallel controlled rectifiers connected in serial relationship between the input (line) and output terminals.

INVENTOR.
GEORGE GAUTHERIN
BY
Morgan, Finnegan, Durham & Pine
ATTORNEYS

INVENTOR.
GEORGE GAUTHERIN

AC REGULATOR EMPLOYING A CONTROL RECTIFIER SWITCHING CIRCUIT

This invention relates to AC regulators employing a resonant circuit together with switching means for controlling the duty cycle and vector relationships in the regulator to thereby maintain a regulated AC output voltage notwithstanding changes in the input (line) voltage, changes in load and changes in line frequency.

It is one object of the invention to provide an AC regulator which provides improved performance while at the same time substantially reducing the complexity and number of circuit elements necessary to effect regulation.

A further object of the invention is to provide a regulator having an improved range of operation and particularly one in which regulation is maintained even in the presence of unusually large increases in line voltage or changes in line frequency.

A still further object of the invention is to provide an improved AC regulator in which, under conditions of minimum line voltage and maximum output voltage, the maximum current capability of the regulator is substantially the same for both resistive and inductive loads.

A still further object of the invention is to provide improved control means for an AC regulator including an improved output monitoring and error circuit which compensates for wave form distortion without the need for conventional r.m.s. detectors.

An additional object of the invention is to provide an AC regulator having an improved control circuit in which auxiliary power and a source of trigger pulse for the controlled rectifiers are derived from the same circuit configuration.

Other objects and advantages of the invention will be set forth in part hereinafter and in part will be obvious herefrom, or may be learned by practice with the invention.

Serving to illustrate an exemplary embodiment of the invention are the drawings of which:

Figure 1:
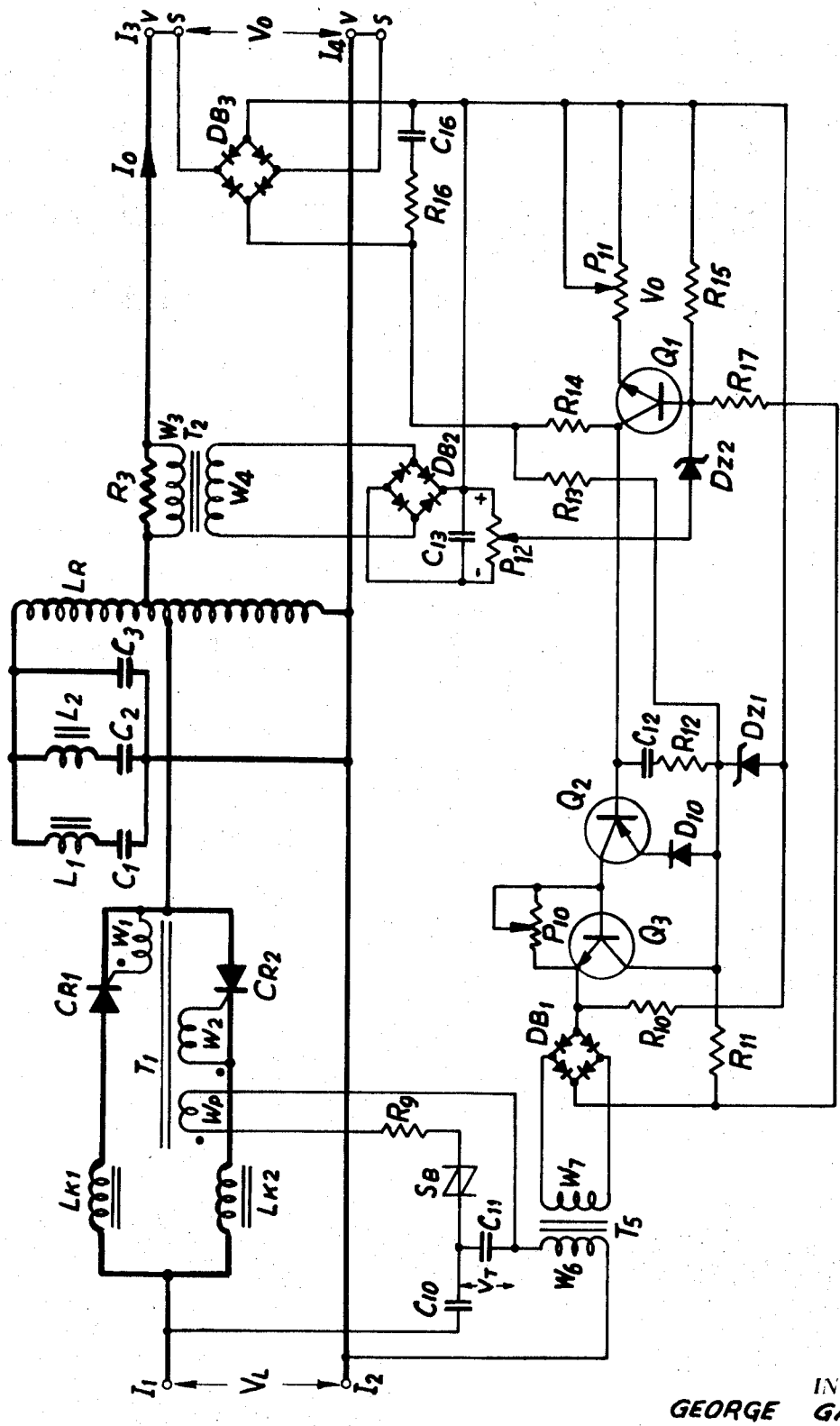
FIG. 1 is a circuit diagram of an illustrative embodiment of the invention.

The general organization of the illustrative embodiment is shown in FIG. 1, the heavy lines indicating the power flow circuit while the thinner lines depict the control circuit associated therewith.

The alternating current source, the voltage $V_L$ of which is to be regulated, is connected to terminals $I_1$ and $I_2$ of FIG. 1. In the line connected to terminal $I_1$ a circuit is provided consisting of two branches connected in parallel. The first branch comprises the series combination of choke $L_{k1}$ and control rectifier $CR_1$; the second branch comprises the series combination of choke $L_{k2}$ and control rectifier $CR_2$. The control rectifiers are oppositely polarized relative to terminal $I_1$.

From this circuit, the line connected to terminal $I_1$, is connected to a tap on inductor $L_R$. Connected in parallel with $L_R$ are three branches, the first branch consisting of capacitor $C_3$, a second branch consisting of inductor $L_2$ and capacitor $C_2$ series relationship, and a third branch consisting of the series combination of inductor $L_1$ and capacitor $C_1$.

The combination of $L_R$ and the above described branches connected in parallel therewith, forms a circuit which is tuned to resonate at the frequency of the input line voltage $V_L$. This frequency will typically be that characteristic of various commercial AC sources, e.g. 60 hertz or 400 hertz. In addition, the three branches $L_1 C_1$, $L_2 C_2$ and $C_3$ form filters for the third, fifth and higher frequency components of the signal applied to the resonant circuit.

One common junction of the resonant circuit is connected to input terminal $I_2$ and to output terminal $I_4$. A tap on the inductor $L_R$ is also connected to output terminal $I_3$ via a resistor $R_3$. The regulated voltage $V_o$ appears across output terminals $I_3$, $I_4$. The circuit illustratively utilizes an autotransformer connection to obtain the desired output voltage range. In some cases an isolation transformer can be used for this purpose.

The control system for controlling the regulating action includes a diode bridge $DB_3$ connected via sensing leads to the output terminals $I_3$ and $I_4$. The rectified voltage appearing at the output terminals of the diode bridge is applied to the error detecting circuit to be described more fully hereinafter. Generally speaking the error detecting circuit develops an error signal in PNP stage $Q_2$. The error voltage is a function of variations of the output voltage from the prescribed value.

The amplified error voltage appearing at the collector of $Q_2$ is applied to a further stage which includes an NPN transistor $Q_3$. The output of $Q_3$ appearing at the emitter thereof is applied to a diode bridge $DB_1$ which is connected across secondary winding $W_7$ of a transformer $T_5$.

The primary of $T_5$ comprises a winding $W_6$ which is energized by a current derived from the input terminals $I_1$, $I_2$.

The circuit supplying this current to $W_6$ comprises a series combination of capacitor $C_{10}$, capacitor $C_{11}$ and $W_6$. That combination is connected across $I_1$ and $I_2$ and is therefore energized by $V_L$.

The alternating current flowing in this series circuit causes a periodic voltage rise across capacitor $C_{11}$ and that voltage, denoted $V_T$, is used to trigger the control rectifiers $CR_1$ and $CR_2$.

To accomplish this there is connected across $C_{11}$ a series combination of a bilateral switch $S_B$, a resistor $R_9$ and an input winding $W_p$ of a transformer $T_1$.

When the voltage across $C_{11}$ reaches a predetermined amplitude the bilateral switch $S_B$ fires and is polarized to conduct current in one direction or the other depending upon the polarity of $V_T$. When switch $S_B$ conducts, current flows in winding $W_p$ causing a trigger voltage to be induced in the two secondary windings $W_1$ and $W_2$. Since switch $S_B$ fires once during each half cycle of input voltage $V_L$ a corresponding voltage pulse is induced in the windings $W_1$ and $W_2$ during each half cycle. These voltages are applied to the respective gate circuits of the controlled rectifiers $CR_1$ and $CR_2$.

Both rectifiers accordingly conduct when their gate circuits receive the correct polarity voltage from their respective windings $W_1$ and $W_2$. The actual conduction time determined by the control action is described more fully hereinafter. When the rectifiers conduct, current may flow between the input and output terminals of the regulators, the duty cycle of this current being controlled by the control system. Through the regulation of this duty cycle in conjunction with the phase shift action of the circuit, the output voltage $V_o$ is maintained constant notwithstanding changes in the input (line) voltage or load.

The duty cycle control is influenced by the conduction of $Q_3$ which acts like an adjustable load on secondary winding $W_7$.

With $Q_3$ saturated, maximum phase shift is realized. In this condition, $W_6$ is effectively short-circuited and the circuit containing $W_6$ acts capacitive causing $V_T$ to be in phase with $V_L$. With $Q_3$ off, the circuit containing $W_6$ acts inductive and $V_T$ now lags $V_L$ by 180°. Accordingly, the phase relationship between $V_T$ and $V_L$ can vary over a range of 180° to provide a wide control of the firing angle of the controlled rectifiers.

Figure 2A:
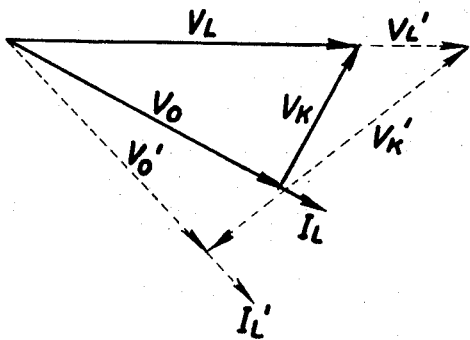
FIGS. 2A, 2B and 2C are vector diagrams illustrating deficiencies in certain prior art circuits.

The basic regulating action generally described above may be further understood by reference to the vector diagrams of FIG. 2. In FIG. 2A, the first condition is depicted by the vectors $V_L$, $V_o$, $I_L$ and $V_k$. The latter represents the drop across the choke circuit of FIG. 1. For ease of explanation the vector diagram excludes the voltage step-up effected by the autotransformer connections to the resonant circuit.

The second condition is also illustrated in FIG. 2A, in this case by the vectors $V_L'$, $V_o'$, $I_L'$ and $V_k'$. Note that while the output voltage vector is shifted angularly it has remained substantially constant notwithstanding the increase in line voltage as exemplified by the difference in magnitude between the original line voltage $V_L$ and the new line voltage $V_L'$.

The regulation technique involves the power relationship
$$P_{in}=V_L I_L PF=P_o=V_o I_o=V_o I_L$$
where $P_{in}$ is power input (real)
PF is power factor, and
$P_o$ is power output Certain simplifications have been adopted. Losses are lumped in the $P_o$ term and input current $I_L$ is assumed equal to output current $I_o$.

For constant $P_o$ and $V_o$, $I_o$ and $I_L$ are constant. Therefore $P_{in}$ or the product $V_L I_L PF$ must be constant. If $V_L$ changes then PF must inversely change to maintain the desired constant condition.

FIG. 2A illustrates the change in PF as reflected in the angular shift of $I_L$ and $V_o$ relative to $V_L$. Note also that $V_k$ appears to have varied as PF varied. The voltage $V_k$ (considering just one branch $LK_1$, $CR_1$) is the sum of the voltages $V_a$, across $LK_1$, and $V_b$, across $CR_1$. Since $V_k$ varies with PF but $I_L$ is to remain constant, then the voltage $V_a$ across $LK_1$ must remain constant. Therefore the voltage $V_b$ must increase to account for the required increase in $V_k$. This action is accomplished by the duty cycle control. An extension of the above will show the regulation effect in the presence of changes in load or line frequency.

One of the primary functions of the control circuit is to regulate the firing angle of the controlled rectifiers thereby controlling the duty cycle such that the output r.m.s. voltage remains substantially constant while at the same time the voltage $V_k$ increases due to the increased drop $V_b$ across the controlled rectifier. Accordingly, an increase in line voltage is accompanied by a shorter conduction period of the controlled rectifier circuit and choke circuit so that the voltage developed in the resonant circuit including inductor $L_R$ remains the same as it was prior to the increase in line voltage.

Figure 2B:
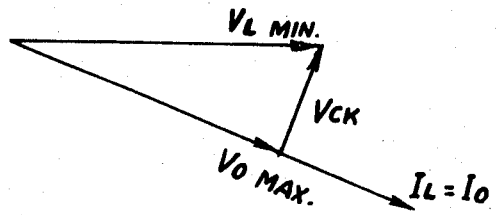
Figure 2C:
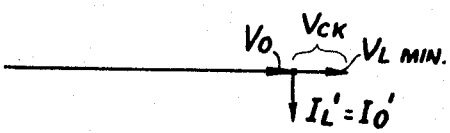

The vector diagrams of FIGS. 2B and 2C illustrate the circuit action characteristic of a number of prior art AC regulators.

FIG. 2B depicts the condition obtaining when line voltage $V_L$ is at its minimum value and $V_o$ is at its maximum value and with a resistive load. Under these conditions, for an assumed minimum resistive load an output current $I_o$ will flow as represented in FIG. 2B. That value of $I_o$ produces the choke voltage $V_{ck}$ of FIG. 2B.

FIG. 2C depicts the condition existing when $V_L$ is again at its minimum, $V_o$ is again at maximum and an inductive load is connected across the output terminals. The resultant output current under these conditions is depicted as $I_o'$ in FIG. 2C.

These vector diagrams illustrate that the current $I_o'$ for an inductive load under the conditions where $V_L$ is minimum and $V_o$ is maximum is substantially less than the available current $I_L$ or $I_o$ under the same line voltage and output voltage conditions for a resistive load.

To overcome this deficiency the circuit of the present invention employs in its illustrative embodiment two series chokes $L_{k1}$ and $L_{k2}$, each serially associated with a respective one of the control rectifiers $CR_1$ and $CR_2$. Under conditions of a reactive load where as noted above the output voltage would tend to drop, the control system so shifts the firing angles of the controlled rectifiers that their conduction periods overlap. This has the effect of reducing the effective reactance of the choke circuit because of the resultant shift in the operating point on the BH curves of the choke. This overlapping conduction also has the effect of adding increased r.m.s. voltage to the chokes by way of increasing their effective volt-time integrals. As a consequence additional output current is made available.*

* under low line voltage and inductive load conditions

The output voltage $V_o$ will in practical situations include some waveform distortion. This complicates the problem of obtaining a sampling signal which is indicative of the r.m.s. value of the output voltage.

In accordance with the invention this problem is alleviated by a simple technique which involves the development of a sample of the output voltage which is a function of both the peak and average values. A proper weighting factor applied to those values yields very nearly the correct r.m.s. value of the wave where it is periodic and continuous.

Sensing of the peak voltage and an indication of the average value of the voltage is accomplished by a circuit which includes the branch comprising resistor $R_{16}$ and capacitor $C_{16}$ serially connected across the sampling bridge $DB_3$. Connected in parallel with this arrangement is the series combination of resistor $R_{14}$, NPN transistor $Q_1$ and adjustable potentiometer $P_{11}$. The base of $Q_1$ is connected to the output end of $P_{11}$ via a resistor $R_{15}$.

The transistor $Q_1$ functions as a constant current source to provide a reference current in the branch which is responsive to both the peak value of the output voltage and its average value. The voltage at the collector of $Q_1$ will accordingly reflect changes in these parameters of the output voltage and will therefor respond to the r.m.s. value. That collector voltage is connected in turn to the base of the error conducting transistor stage $Q_2$.

Applied to the emitter circuit of $Q_2$ is a reference voltage across the zener diode $D_{z1}$. That diode is connected through the emitter to semiconductor diode $D_{10}$. The zener $D_{z1}$ is energized in turn through the output of the auxiliary supply bridge $DB_1$ via resistor $R_{10}$ and resistor $R_{11}$ connected thereto.

The combination of the sample voltage and reference voltage in the emitter circuit of $Q_2$ produces an error voltage which controls in turn the base-emitter current of stage $Q_3$. As previously explained, the emitter-collector circuit of the latter thus presents a controlled resistance which loads secondary winding $W_7$ of $T_5$ via diode bridge $DB_1$. This variable load controls in turn the inductance in the primary circuit of $T_5$ thereby controlling the firing times of the controlled rectifiers $CR_1$ and $CR_2$ by controlling the phasing of the voltage $V_t$ developed across $C_{11}$ as previously explained. Control is such that a full 180° range is obtainable.

The circuit of FIG. 1 also includes a current limiting function. Output current $I_o$ flows through resistor $R_3$ controlling the voltage drop across that resistor. That voltage is supplied in turn to a winding $W_3$ of a transformer $T_2$. The voltage induced in secondary winding $W_4$ of $T_2$ accordingly depends upon the magnitude of output current. That voltage is rectified by a diode bridge $DB_2$ and is then applied across a filter $C_{13}$ and a potentiometer $P_{12}$ connected in parallel with the filter. An adjustable voltage may be derived from the arm of $P_{12}$ and is applied via zener diode $D_{z2}$ to the base of $Q_1$. When output current exceeds the predetermined limit as set by $P_{12}$, the voltage from $P_{12}$ is sufficient to alter the conduction of $Q_1$, thereby maintaining the firing of control rectifiers $CR_1$ and $CR_2$ to the angles which satisfy the current limit.

It should be understood that in studying and practicing the invention, modifications will undoubtedly occur to those skilled in the art. The invention is thus not to be limited to the specific circuits and components herein shown and described, but departure may be made therefrom within the scope of the accompanying claims.

1. An AC regulator for generating a regulated AC output voltage independent of changes in line frequency, line voltage or load, said AC regulator comprising
   a. input and output terminals;
   b. a line resonant circuit tuned to resonate at the frequency of the input line voltage, said line resonant circuit being connected between said input and output terminals;
   c. parallel choke means connected in serial relationship between said input and said line resonant circuit;
   d. switching means connected in serial relationship with each of said choke means for regulating the flow of current between said input and output terminals, said switching means comprising oppositely poled controlled rectifiers;
   e. control means responsive to the peak and average values of the output voltage appearing at said output terminals and operatively coupled to said switching means for controlling the firing times of said switching means, said control means comprising:
      i. a bridge rectifier having input and output terminals, said input terminals being operatively coupled to said output terminals of the regulator;

ii. an RC network operatively coupled to said output terminals of said bridge rectifier, the resistance and capacitance of said network being serially coupled and proportioned to generate a signal in response to the peak and average values of said output voltage;
iii. a detector circuit for converting said peak and average signal values to a signal indicative of the r.m.s. value of the output independent of wave shape;
iv. means for applying said signal to a solid-state device for regulating the conductivity of said device;
v. a transformer having a primary circuit comprising a primary winding with serially coupled capacitance and a secondary circuit comprising a secondary winding, said primary circuit being operatively connected across said input terminals while said secondary winding is operatively connected across the output of said solid-state device, the conductivity of said solid-state device being determinative of the impedance characteristics of said primary circuit so as to vary the phase relationship between the voltage appearing across said input terminals and the voltage appearing across the serially coupled capacitance of said primary circuit;
vi. a bilateral switch operatively coupled to said serially coupled capacitance responsive to a minimum voltage appearing across said serially coupled capacitance, said switch being capable of conducting current in one of two directions dependent upon the characteristics of the voltage appearing across the capacitance serially coupled with said primary winding;
vii. means responsive to the flow of current passed by said bilateral switch for generating a voltage capable of actuating said switching means such that a regulated output voltage appears at said output terminals.

2. An AC regulator as described in claim 1 additionally comprising current limiting means operatively coupled between said line resonant circuit and said output terminals, said current limiting means being capable of generating an error signal indicative of variations in output current for controlling the firing times of said switching means so as to attain a regulated output.